United States Patent [19]
Laakmann

[11] Patent Number: 4,805,182
[45] Date of Patent: Feb. 14, 1989

[54] RF-EXCITED, ALL-METAL GAS LASER

[75] Inventor: Peter Laakmann, Seattle, Wash.

[73] Assignee: Synrad, Inc., Bothell, Wash.

[21] Appl. No.: 110,125

[22] Filed: Oct. 19, 1987

Related U.S. Application Data

[63] Continuation-in-part of Ser. No. 857,354, Apr. 30, 1986.

[51] Int. Cl.$^4$ .............................................. H01S 3/097
[52] U.S. Cl. ........................................ 372/82; 372/87; 372/61; 372/34
[58] Field of Search ...................... 372/82, 81, 55, 58, 372/34, 61, 87

[56] References Cited

U.S. PATENT DOCUMENTS

| | | | |
|---|---|---|---|
| 3,394,320 | 7/1968 | Medicus | 372/61 |
| 3,603,895 | 9/1971 | Medicus | 372/61 |
| 3,828,277 | 8/1974 | Otto et al. | 372/82 |
| 4,481,634 | 11/1984 | Grossman et al. | 372/87 |
| 4,493,087 | 1/1985 | Laakmann et al. | 372/82 |
| 4,553,242 | 11/1985 | Opower et al. | 372/82 |
| 4,633,478 | 12/1986 | Robusto | 372/82 |

OTHER PUBLICATIONS

*Optical Gain Measurement at 10.6 m in an 80 m Hollow-Core Slab Waveguide,* Ronald O. Miles, pp. 1071-1074.
*An Anodised Aluminium Waveguide $CO_2$ Laser,* D. V. Willetts and C. Hartwright, vol. 11, No. 8 (1978.06).

*Primary Examiner*—Léon Scott, Jr.
*Attorney, Agent, or Firm*—Seed and Berry

[57] ABSTRACT

All-metal, RF-excited gas lasers employing organic or inorganic insulating material including polyimide and aluminum oxide to provide a structurally homogeneous laser capable of low-cost fabrication and broad temperature ranges suitable for military and commercial applications. A particularly novel embodiment employs an extruded housing and electrodes and relies almost solely upon gas conduction and gas convection cooling, obviating compression heat sinking. The latter embodiment can permit gas flow between the laser cavity and tube gas chambers through elongated gaps or spaces at the corners of the cavity. Insulators support the electrodes in a few places and facilitate simple, low-cost assembly. The latter geometry is also well adapted for use in folded configurations featuring multiple lasing sections and a common discharge electrode.

57 Claims, 4 Drawing Sheets

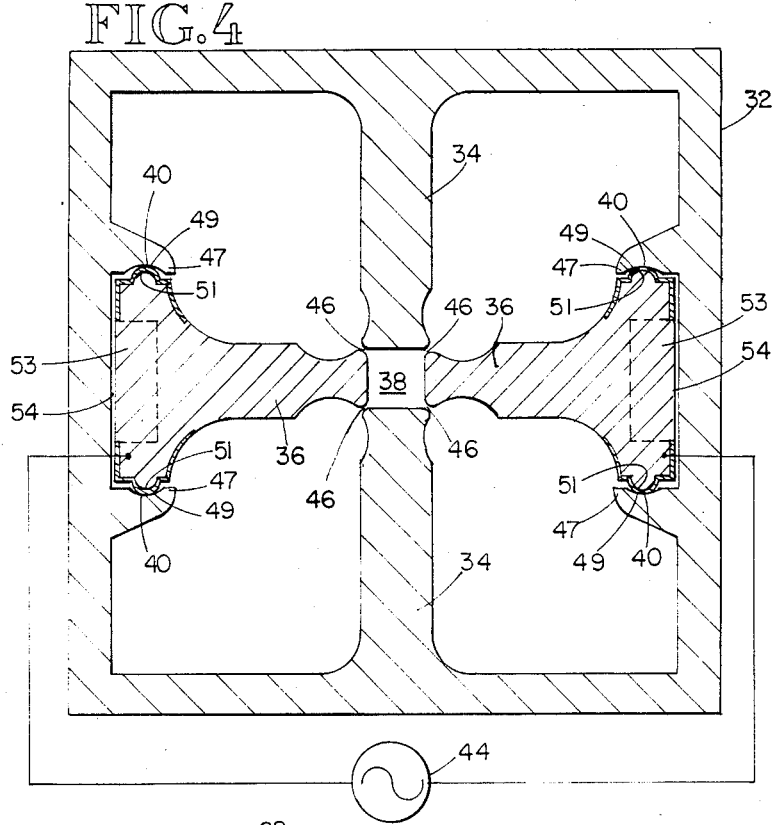
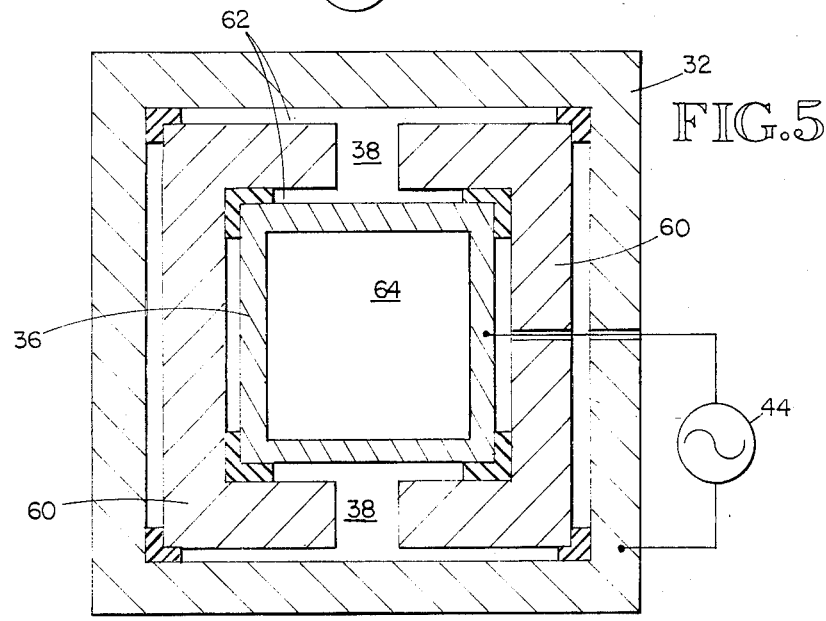

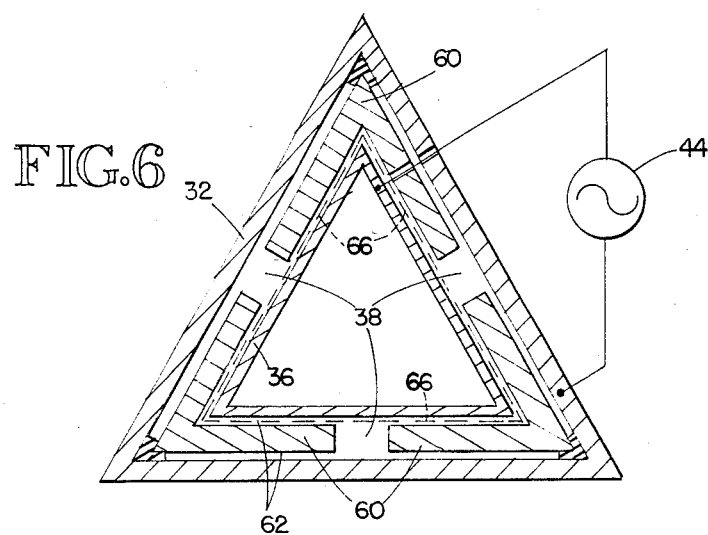
FIG. 6
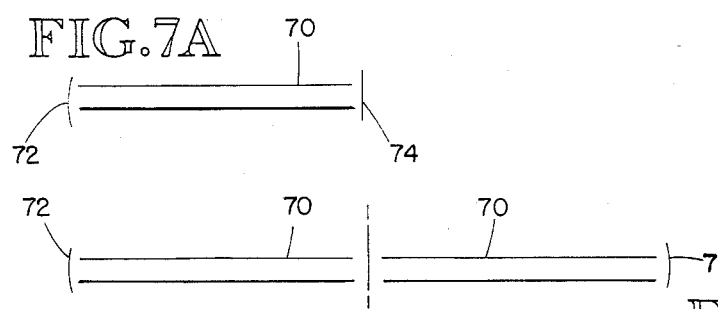
FIG. 7A
FIG. 7B
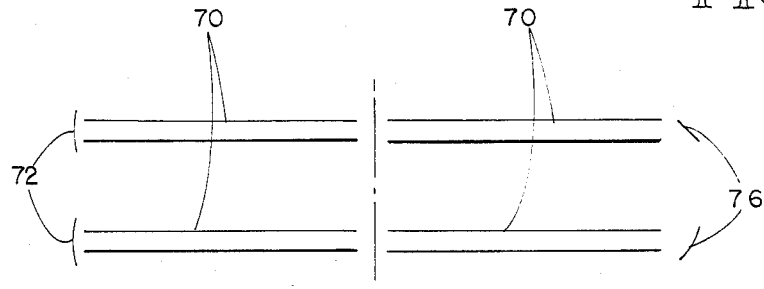
FIG. 7C

RF-EXCITED, ALL-METAL GAS LASER

REFERENCE TO RELATED APPLICATION

This application is a continuation-in-part of co-pending U.S. application Ser. No. 857,354 filed 4/30/86.

TECHNICAL FIELD

This invention relates generally to lasers and more specifically to all-metal, RF-excited gas lasers.

BACKGROUND ART

RF-excited waveguide, carbon dioxide lasers have found a large number of applications in the last several years because of their compact size, reliability and relative ease of manufacture. The basic patent governing these layers is U.S. Pat. No. 4,169,251, issued to Katherine D. Laakmann. This patent describes the basic geometry and physics of the device. An additional patent, U.S. Pat. No. 4,393,506, issued to Peter Laakmann et al., covers the preferred implementation of such lasers as well as a novel water vapor getter. U.S. Pat. No. 4,373,202, issued to Katherine D. Laakmann et al., covers a longitudinally RF-excited structure.

For commercial purposes and power levels up to about 25 watts, the metal/ceramic technology disclosed in U.S. Pat. No. 4,393,506 has been extremely successful because it combines low manufacturing cost with adequate performance and proven lifetime, measured in years, without gas replacement.

For military purposes, ceramic-only structures are being used to eliminate differential thermal expansion between the ceramic and metal parts of the cavity. The elimination of thermal mismatch is a requirement in these applications because of the typically required operating temperature range of −40° to +50° C. for military hardware. Similarly, high-powered (above 25 watts), folded lasers for commercial applications are also being built from all-ceramic structures to assure the greater precision required by these folded structures. The basic cavity structure of a longitudinally excited, all-ceramic laser is shown in U.S. Pat. No. 4,373,202. The same physical structure has also been used with transverse RF excitation.

The all-ceramic laser is intrinsically more costly to fabricate than the basic commercial metal/ceramic structure. However, for high power output of large operating temperature range, there has so far been no alternative.

An additional problem with both approaches is the fact that assembly and closure involve solder sealing. In the case of the metal/ceramic structure, relatively low-temperature solder sealing must be used to avoid thermal distortion of the composite waveguide. In the case of the ceramic structure, no other method is known to seal the materials. The solder process requires a "wet" wash afterwards, which leads to long reprocessing times to remove water contamination, the enemy of carbon dioxide laser gain.

Another problem in these prior art lasers is that the devices are difficult to "outgas" because the structures involve members under compression trapping gases, particularly water vapor.

DISCLOSURE OF THE INVENTION

The present invention solves the thermal mismatch problem of the prior art metal/ceramic laser by using an all-metal structure to combine the advantages of metal fabrication with the performance advantages of a homogeneous structure.

An RF-excited, all-metal laser seems at first a contradiction of terms because supporting the required electric fields generally requires insulators. An exception to that rule is a waveguide (microwave)-excited gas medium. Such laser action has been demonstrated in the past but has been considered to be of no commercial value.

One embodiment of the all-metal, transversely excited laser consists of a structure similar to that shown in FIG. 2 of U.S. Pat. No. 4,373,202, but constructed from metal instead of ceramic. The structure consists of top and bottom aluminum plates separated by aluminum spacers to form a rectangular cavity or bore of about 0.1 to 0.3 inch in width and height. A transverse electric field is created by electrodes running along the bore on top and bottom. Electrode width may be 50% to 80% of the bore. Excitation is applied by means of a bi-phase drive where the instantaneous voltage of each electrode is 180 degrees out of phase relative to the other electrode when measured against reference ground (cavity walls). This forces the field to have a relatively uniform value along the electrode separation while cutting in half the electric field that has to be supported between electrode and ground.

The electrode pairs are created by converting the aluminum surface facing the bore to aluminum oxide by hard-anodizing to a thickness of about 0.01 inch. The electrodes are applied by evaporation, plating or other conventional processes. Additional insulator surfaces for protection of the electrode may be created by additional anodizing or a vacuum coating technique. This laser structure contains no commercial insulating materials except for wire feed-throughs and the like, which are not structural. Anodized metal surfaces are continuous with the base metal and do not have the temperature limitations of composite materials.

A second embodiment also employs the aluminum sandwich configuration but uses printed circuit films to carry the electrodes for the bi-phase excitation. These films may either be laminated to the top and bottom plates or be sandwiched between the aluminum parts. A useful thickness for the dielectric is 5–20 mils. The electrode surface may also be laminated behind an additional layer of insulator. Useful insulating materials may be organic or inorganic, with inorganic materials the more stable choice. An example of inorganic materials would be mica and an example of an organic, high-temperature insulator would be polyimide. Technically, this printed circuit implementation is not "all-metal." However, because the thickness and mechanical properties of the insulator layer do not affect the structural characteristics, it does not suffer from differential thermal expansion that would limit significantly the operating or process temperature range of the device.

A third embodiment of the invention has been found to be most useful since it addresses additional shortcomings of current lasers and satisfies all of the desired objectives. In this implementation, no functional insulators at all are used. The bi-phase excitation is applied directly to two opposing walls of the bore, using only a few mils of airspace as insulators in the corners of the cavity. The discharge forms between the electrodes (spaced from 0.1 to 0.4 inch) in a uniform way that ignores the presence of the closely spaced side walls. Any insulators in this type of device are used only to support the electrodes and are not near the discharge. It has been found by measurement and calculation that the electrodes can be cooled using the high thermal conductivity of the lasing gas without using structural (decomposition) members to conduct the heat away from the plasma. This embodiment can be conveniently fabricated using aluminum extrusion techniques for both housing and electrodes. This embodiment also uses bi-phase excitation.

A fourth embodiment of the invention has the same features as the third embodiment but does not rely upon heat convection from finned electrodes. The fourth embodiment conducts the heat from the electrodes through the laser gas to the housing, and possibly uses direct conduction from the electrode to the housing through a thermally conductive electrical insulator.

The fifth and sixth embodiments of the invention define a plurality of laser bores in a single structure. Accordingly, these embodiments are particularly useful when constructing folded lasers. The sixth embodiment additionally discloses an optional electrical insulator placed in the insulating gap between an inner electrode and each of the laser bores.

A seventh embodiment of the invention overcomes many of the demanding mechanical tolerances that are imposed by the preceding embodiments. The seventh embodiment is composed of a modular construction of extrusions contained within and electrically connected to the outer housing. Together with the extruded electrodes, the modular pieces within the housing define a lasing gas-containing cavity that can maintain the required high electric fields and yet be cooled by the gas and electrical insulator conducting mechanisms described in connection with the foregoing embodiments.

All of the above embodiments are based on using the nonlinear breakdown and ionization characteristics of gases. In typical gases, breakdown and subsequent ionization occur at a particular combination of field strength (E-field) and absolute RF potential, as well as frequency. In typical (solid) insulators, breakdown is almost exclusively a function of E-field (RF or DC).

This means that the ionization potential of a gas does not change proportionally to the gap spacing. A way to visualize this effect is to realize that a certain amount of absolute kinetic energy is required before ionization can occur. Therefore, a large gap spacing combined with a large voltage allows for a longer acceleration distance and therefore facilitates ionization.

Measurements of breakdown voltage and maintaining voltage at a typical pressure of approximately 50 Torr and a frequency of 50 MHz have shown that the minimum breakdown voltage occurs at a spacing of about 0.1 inch. For parallel plates, this voltage is about 100 to 150 V rms. As the spacing is reduced, the breakdown voltage rises to very large values. It is very difficulty to initiate breakdown in the 0.01- to 0.03-inch region. As the spacing of parallel plates is increased above about 0.1 inch, the breakdown voltage increases slowly to values near 200 V for spacings of about 0.15 to 0.3 inch. The maintenance voltage after breakdown is power loading- and spacing-depending and has values between about 100 and 300 V rms for typical loading of 5 to 20 W/inch. With higher power loading, abnormal discharges (hot spots) occur which represent a negative resistance transition. This region cannot be used for laser work.

It has been found that parallel plates show lower breakdown voltages than right angle geometries. The highest breakdown voltages have been found for butt sections. These considerations are important for the design of the necessary transition regions outside of the laser bore geometry.

Another aid to confining the plasma to the laser bore is the use of bi-phase excitation, since it reduces the voltage to ground (bore walls) to one half. With these rough rules and principles in mind, it is now possible to design a wide variety of discharge structures that have the plasma confined to the laser bore.

It has been found that this desirable situation takes an extreme values for the laser gases, pressures, and frequencies used in typical gas lasers. For example, experiments have shown that a gap spacing of 0.3 inch, with each electrode being separated from ground by only 0.005 inch, does not lead to discharge between electrode and ground while initiating and maintaining the electrode-to-electrode plasma. Note that the field strength between electrode and ground in this case is 30 times greater than the field strength between electrodes. The 0.005-inch dimension is not a limiting case but simply a convenient distance that was tested.

This effect then makes possible both the insulating and cooling features of the above embodiments.

OBJECTS OF THE INVENTION

It is a principal object of the present invention to overcome the aforementioned thermal mismatch problems of prior art lasers by providing an all-metal gas laser which affords the easier fabrication of a metal structure and performance advantages of a homogeneous structure.

It is an additional object of the present invention to provide a gas laser, the structure of which can be sealed by welding without requiring costly and potentially disadvantageous wet processing.

It is a further object of the present invention to provide a gas laser structure which more substantially eliminates traps and virtual leaks to improve gas cleanliness and outgassing.

It is a still further object of the present invention to provide a novel gas laser of reduced complexity which is easier to fabricate and assemble than are prior art gas lasers.

The aforementioned objects and advantages of the present invention, as well as additional objects and advantages thereof, will be more fully understood hereinafter as a result of a detailed description of preferred embodiments of the invention when taken in conjunction with the following drawings.

BRIEF DESCRIPTION OF THE DRAWINGS

FIG. 4 is a cross-sectional view of a fourth embodiment of the invention.

FIG. 5 is a cross-sectional view of a fifth embodiment of the invention.

FIG. 6 is a longitudinal view of a sixth embodiment of the invention.

FIG. 7A is a schematic view of a gas laser of the invention, the gas laser being made from a single laser section.

FIG. 7B is a schematic, longitudinal view of a gas laser of the invention, the gas laser being made from two laser sections.

FIG. 7C is a schematic, longitudinal view of the gas laser of the invention, the gas laser being made from a folded configuration of four laser sections.

BEST MODE FOR CARRYING OUT THE INVENTION

Figure 1:
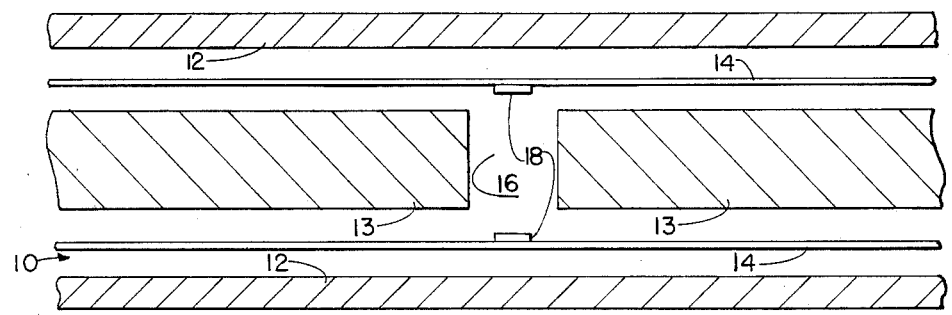
FIG. 1 is a cross-sectional exploded view of a first embodiment of the invention.

Referring first to FIG. 1, it will be seen that the first all-metal gas laser embodiment 10 of the present invention comprises top and bottom aluminum plates 12 separated by a pair of aluminum spacers 13 to surround and form a rectangular cavity or bore 16. The plates and spacers are shown separated to better illustrate the structure of the invention. However, in the final structure, the plates and spacers may be in contact or separated by small air gaps. In typical applications, cavity or bore 16 would have dimensions of 0.1 to 0.4 inch in both width and height. A transverse electric field is created by electrodes 18 running along the top and bottom of bore 16. The electrodes 18 may be, by way of example, 50% to 80% of the bore width. Excitation is applied utilizing a bi-phase drive where the instantaneous voltage of each electrode is 180 degrees out of phase with respect to the other when measured against reference ground at the cavity walls. Such bi-phase drive forces the field to have a sufficient value along the electrode separation while halving the electric field that must be supported between the electrode and ground. The electrodes 18 are provided on a pair of polyimide printed circuit films 14 which may be either laminated to the top and bottom plates 12 or sandwiched between the aluminum parts. A typical thickness for the polyimide printed circuit film dielectric is 5–20 mils. The electrode surface may also be laminated behind an additional layer of polyimide. Polyimide is a proven vacuum material of excellent electrical and thermal properties. Its expansion coefficient closely matches that of aluminum. However, expansion match is not an issue as the thin film is not structural in nature and cannot distort the underlying metal structure.

Figure 2:
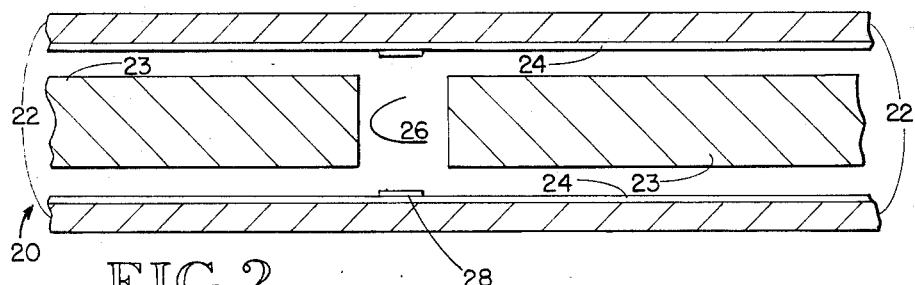
FIG. 2 is a cross-sectional exploded view of a second embodiment of the invention.

The second all-metal gas laser embodiment 20 of the present invention is represented in FIG. 2. This embodiment comprises a pair of aluminum plates 22, a pair of aluminum spacers 23, the latter surrounding and forming a rectangular cavity or bore 26, and a pair of electrodes 28, all of which function and serve the same purpose as the corresponding elements of the first embodiment of the invention, illustrated in FIG. 1. However, in the second embodiment of FIG. 2, instead of using a pair of printed circuit films, the electrode pairs are created by converting the aluminum surfaces facing the bore 26 to aluminum oxide by hard-anodizing aluminum plates 22 to form corresponding aluminum oxide surfaces 24, which may be of about 0.01 inch in depth. The electrodes 28 are applied by evaporation plating or other conventional processes. Additional insulator surfaces for protection of the electrodes can be provided by additional anodizing or vacuum-coating techniques.

This second embodiment of the invention contains no commercial insulating materials except wire feedthroughs and the like, all of which are not structural. Anodized metal surfaces are continuous with the base metal and therefore do not have temperature limitations. The aluminum oxide integral dieletric does not introduce any new elements into the laser that may contaminate it. Lasers routinely operate with anodized surfaces in direct contact with the plasma. Furthermore, the dielectric strength of the anodized surfaces easily supports the 100 volts or more of radio frequency signal strength required. Excellent laser operation and performance life can therefore be anticipated. FIG. 2 also shows the plates and spacers, separated only for purposes of better illustrating the inventive structure.

Figure 3:
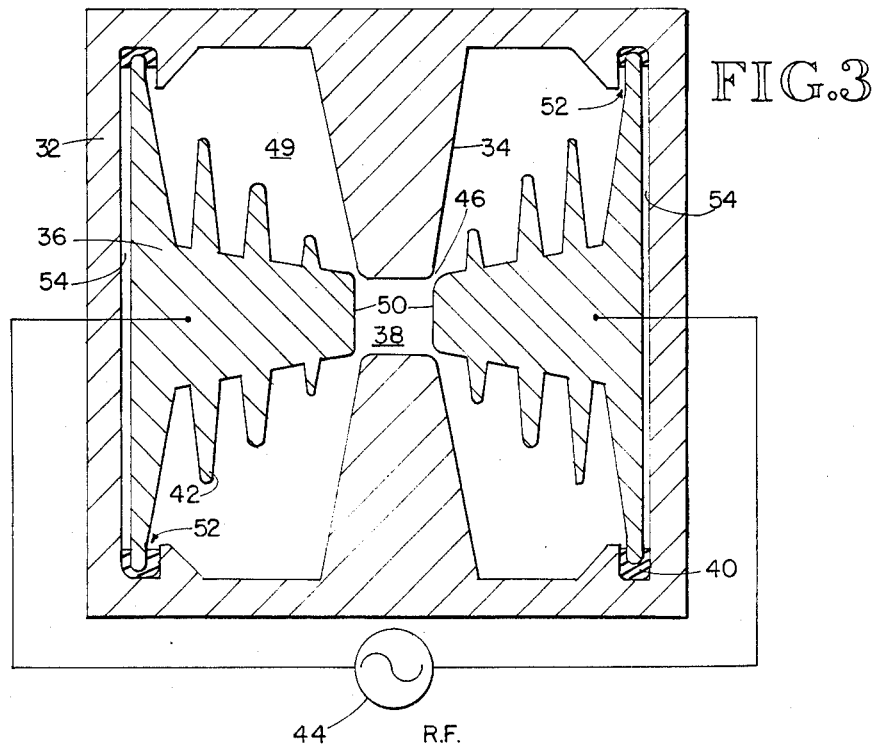
FIG. 3 is a cross-sectional view of a third embodiment of the invention.

A third all-metal gas laser embodiment of the present invention is shown in cross section in FIG. 3. This embodiment is a conduction/convection gas-insulated laser structure designed to use an extruded aluminum housing 32. Aluminum housing 32 forms a pair of grounded wall members 34 which provide two of the four surfaces surrounding and forming a rectangular cavity or bore 38. The other two surfaces forming bore 38 are provided by a pair of finned electrodes 36 which may also be extruded aluminum components of the third embodiment. Aluminum housing 32 may be, by way of example, a two inch-square extrusion; and the two finned electrodes 36 may also be, by way of example, aluminum extrusions. The electrode extrusions are provided with longitudinal fins 42 to facilitate convection cooling. Spaces or gaps 46 are provided at the corners of the rectangular cavity or bore 38 in a dimension of about 0.001- to 0.05-inch inch space between the bore-facing surfaces of the electrodes 36 and the bore-facing surfaces of the grounded wall members 34. Gaps 46 may be made equal to zero by relying on anodizing as insulation. Such a closed periphery bore is desirable in true waveguide lasers having bore sizes near 0.1 inch to limit diffraction losses. A "true waveguide" laser is one in which the laser electromagnetic mode is substantially independent of the optics and is instead substantially dependent only on the laser bore geometry and wherein the laser operates in the fundamental mode. Gaps 54 between the electrodes 36 and the housing 32 provide gas-conduction cooling. Electrodes 36 are provided with anodized discharge facing surfaces 50 in the form of a thin, hard-anodized coating to reduce hot spots. The anodized layer may be, by way of example, 0.0005 to 0.002 mil in thickness.

The electrical capacity of the structure of the third embodiment of the invention, shown in FIG. 3, is about 8.5 picofarads per linear inch measured across the discharge. The temperature rise of each electrode is about 22° C. at a power input of 10 watts per linear inch. Because the top and bottom electrodes are directly connected to the outside of the housing 32, the average temperature rise of the rectangular cavity or bore 38 is therefore about 11° C. Because the plasma core has a temperature rise of about 150° C., it is evident that more than adequate heat removal is attained by the structure of the third embodiment.

Electrical excitation is provided by the radio frequency generator 44 connected to the electrodes 36. The electrical excitation frequency is normally in the range of 20 to 200 MHz and more typically would be one of the authorized ISM frequencies at 27 or 40 MHz. The RF excitation is applied in a balanced bi-phase form so that each electrode carries only one-half of the total voltage to ground.

Electrodes 36 are supported by polyimide spacers, or other high-temperature insulators 40 at periodic intervals of several inches along the length of the discharge section of the laser, or simply at both ends. Insulators 40 can also act as bearings during the assembly of the third embodiment 30, which can include the step of sliding the electrodes 36 into the housing extrusion recesses 52. Induction coils (not shown) to neutralize the capacity at the operating frequency may be applied at both ends of the assembly prior to closing the tube with the end plate optical assemblies (not shown), as is typical in current state-of-the-art lasers. Alternatively, the coils may be applied externally where the bi-phase radio frequency excitation is applied to the structure of the laser. Insulators 40 hold the electrodes 36 spaced from the side walls of the aluminum housing 32 thereby forming a pair of open space insulating gaps 54 on either side of the housing.

It has been found by measurement and calculation that the electrodes 36 can be cooled using the high thermal conductivity of the lasing gas, which is typically about 70% helium. Accordingly, it is not necessary to use structural compression members to conduct away the heat from the plasma. Therefore, this type of device can be conveniently fabricated using aluminum extrusion techniques for both the housing and electrodes. Essentially all interior surfaces of the laser are in direct contact with the lasing gas. Therefore, outgassing during laser processing is much more effective, leading to a cleaner gas and longer laser life, and making it possible to provide gas lasers that are more sensitive to contamination, such as carbon monoxide lasers.

Because the dielectric constant of the insulating medium is 1.0 instead of 8.9 for the typically used alumina ceramic, electrical standing waves along the laser bore are increased in wavelength by up to $\sqrt{8.9}$, thereby leading to more uniform E-fields, longer lasers and higher useful excitation frequencies. Elimination of thermal expansion mismatch makes possible an all-welded, dry process device that can withstand high bakeout temperatures and military temperature ranges. The elimination of machined ceramic parts and the ease of assembly, due to the elimination of compression heat sinking design, significantly reduce the cost of fabrication. By using gas conduction and convection cooling of the electrodes, the absence of the high dielectric constant insulators found in prior art lasers reduces the electrical capacity, thereby resulting in the opportunity to use higher operating frequencies and maintaining higher electrical efficiencies. The corner gaps 46 permit transverse gas exchange between the plasma and the tube gas contained within chambers 49 adjacent the cooling find 42. This provides additional gas convection cooling as well as a continuous supply of fresh gas. Both of these effects increase the laser efficiency.

FIG. 4 is a cross-sectional view of a fourth embodiment of the invention. The housing 32 can be an extruded aluminum piece forming a pair of grounded wall members 34 which provide two of the four surfaces surrounding and forming the rectangular cavity or bore 38. Conduction is the primary heat transfer mechanism in the embodiment shown in FIG. 4. Accordingly, each of the electrodes 36 has smooth cross-sectional surfaces that provide spaces or gaps 46 of approximately 0.001 to 0.05 inch between the bore-facing surfaces of the electrodes 36 and the bore-facing surfaces of the grounded wall members 34. Each of the electrodes 36 is held in place by a pair of longitudinally extending tangs 47 extending inwardly from an inner wall of the housing 32 and containing a "V" groove 49. Each of the electrode 36 has two protrusions 51 which engage the corresponding "V" grooves 49. Protrusion 51 is separated from "V" groove 49 by an insulator 40 which holds the electrodes 36 spaced apart from the side walls of the aluminum housing 32. This forms a pair of open space insulating gaps 54 on either side of the housing 32. Alternative to the use of the insulator 40, the surface of the "V" grooves 49 on the electrodes 36 can be anodized, thereby providing electrical insulation between the electrodes 36 and the housing 32. A third alternative is to replace the protrusions 51 with ceramic balls which can be spring loaded in the electrodes 36 and which automatically serve to center the electrodes 36 between the corresponding tangs 47.

The electrodes 36 of FIG. 4 can also be modified in order to provide increased heat transfer from the electrodes 36 to the housing 32. This is accomplished by forming a recessed portion 53 (indicated by dashed lines) on the side of each of the electrodes 36 that face the insulating gap 54. A loosely fitting piece of alumina ceramic, placed into the recessed portion 53 with a clearance of about 0.002 inch between the electrode 36 and the side walls of the aluminum housing 32, will increase the heat transfer between the electrode 36 and the housing 32 by a factor of about 3 for a 10° C. temperature rise of the electrodes at a power loading level of approximately 10 to 15 watts per inch. Based on the measured heat transfer of laser gas (about 15° Kelvin per watt per meter) and the known heat transfer of alumina, and taking into account the dielectric constant of alumina (approximately 8.9), the ceramic is about 33 times as efficient in removing heat per unit of electrical capacity incurred.

The ends of the wall members 34 and the electrodes 36 that extend toward the bore 38 have concave outer surfaces of approximately the same radius. As discussed above, this raises the breakdown voltage as compared to the grounded wall member-electrode configuration shown in FIG. 3.

FIGS. 5 and 6 show discharge sections suitable for folded optical configurations, it being understood that the discharge sections can also be used independently, if desired. FIG. 5 shows a two-bore cavity, while FIG. 6 shows a three-bore design. The design principles are essentially the same as in FIGS. 3 and 4, with some slight differences for convenience of fabrication.

The housing 32 may again be an aluminum extrusion. So also can electrode 36 and spacers 60. The insulating and heat conduction gaps 62 are in the same size range as the gaps 54 in FIGS. 3 and 4, i.e., 0.005 to 0.03 inch. Electrodes 36 and spacers 60 are positioned again by high-temperature insulators applied at both ends of the housing 32 before the closure of the tubes. The gas reservoir 64 is located inside the driven electrode 36. The drive (RF) voltage is applied unsymmetrically (single phase) for convenience. However, the spacers 62 form a virtual ground similar to that shown in FIGS. 3 and 4 since the capacity from electrode 36 to spacer 60 and spacer 60 to housing 32 are made identical. Since the spacer 60 floats at one-half of the RF voltage applied, the fields in the bores 38 are identical to those produced by the bi-phase excitation described above.

The foldable configurations shown in FIGS. 5 and 6 feature symmetrical heating to provide minimum distortion of the optical structure. There are, however, no transition regions outside the bores 38, since the spacings change from the 0.005- to 0.03-inch gaps 62 to larger spacings in the bore 38 itself. FIGS. 5 and 6 recognize only two spacings: that of the bore 38 and that of the heat conduction gap 62. There is, therefore, no possibility of parasitic discharge outside the bore, and no shapes such as are shown in FIGS. 3 and 4. Resonating coils can be applied as discussed earlier. The configuration in FIG. 6 further includes optional insulators 66 placed in the insulating gaps 62 between the spacers 60 and the driven electrode 36 immediately adjacent the laser bores 38. It has been found particularly advantageous to use the insulators 66 in these locations to provide power sharing and equalization by dielectric ballasting.

The optical design used with lasers having discharge sections of the types shown in FIGS. 5 and 6 follows conventional practice regardless of whether the sections are unfolded or folded. Both diameters can be configured as "waveguide" lasers with bore diameters of about 0.1 inch or less, or as "free space" lasers for larger bore sizes. For "free space" resonator design, curved mirrors can be applied at one or both ends in accordance with well-known practice.

It has been found that a desriable bore size for the discharge sections shown in FIGS. 3-6 is around 0.19 inch square for a resonator length of about 15 inches and mirrors of 200- to 300-cm radius. As power level is changed and length of the folded or unfolded laser is changed, conventional practice is to change the bore diameter and reflector mirror radius. With the wide variety of products to be manufactured, this is undesirable, as the change leads to proliferation of other changes and detracts from standardization. With "waveguide laser" technology, bore size is kept constant throughout the product range. A similar practice can be achieved with free-space lasers of this type by using several curved mirrors of equal radius and constant bore size throughout the power range from 10 to 100 W or more. As shown in FIG. 7A, a single laser section 70 can be operated by having a single curved mirror 72 located at one end and a flat mirror 74 at the other end. The basic 15-inch optical section 70 can be retained by using two curved mirrors 72 for an unfolded 30-inch laser (see FIG. 7B) and using additional curved mirrors 72 of equal radius for each fold. FIG. 7C shows a single folded laser. By these means, the basic resonator diffraction and mode discrimination characteristics of the basic section 70 are maintained for integral scaling factors of 2, 4, 6, etc. If two mirrors 76 are used for folding, the combination of the two should have the optical power of an equivalent spherical resonator mirror. Any optical device having the equivalent power can be used as a turnaround device for the folded laser shown in FIG. 7C.

As discussed above, heat transfer and capacity to ground are intrinsically related because of the properties of the lasing gas. In terms of the price paid for in "electrical capacity," laser gas is not as efficient as ceramic as a heat transfer medium. That is, alumina is about 33 times as effective as laser gas in removing heat (per unit of capacitance). As seen by earlier calculations, the total temperature rise of the discharge section is about the same as that of earlier metal/ceramic lasers due to compensating factors. However, it is possible to increase heat transfer by using additional ceramic transfer agents without giving up any of the cleanliness and performance features of these "all-metal" lasers. This may be advantageous in, for example, CO lasers, which are very sensitive to excessive plasma temperatures. In order to accomplish this, ceramic strips can be loosely inlaid into the electrodes and/or spacers shown in FIGS. 5 and 6 to decrease the heat transfer gap from 0.02 to 0.002 inch.

What have been taught above are design principles involving the use of nonlinear gas breakdown characteristics to both insulate and transfer heat using the laser gas. It should be realized that, for example, the high breakdown voltage for closely spaced elements applies not only to metals but also to ceramic metal sandwiches. Lasers can therefore be designed to make use of small gas gaps between ceramic and metal elements. Such lasers would have similar advantages in cleanliness and high-temperature performance but could also take advantage of using the ceramic as a dielectric loading element at the discharge to provide a more uniform discharge. This is current practice in all ceramic lasers. Such a dielectric loading element could be introduced to the central electrode, for example, where it faces the discharge region shown in FIG. 4. Soft mounting and gas gaps on both sides of this ceramic plate could assure cleanability and environmental stability.

Figure 8:
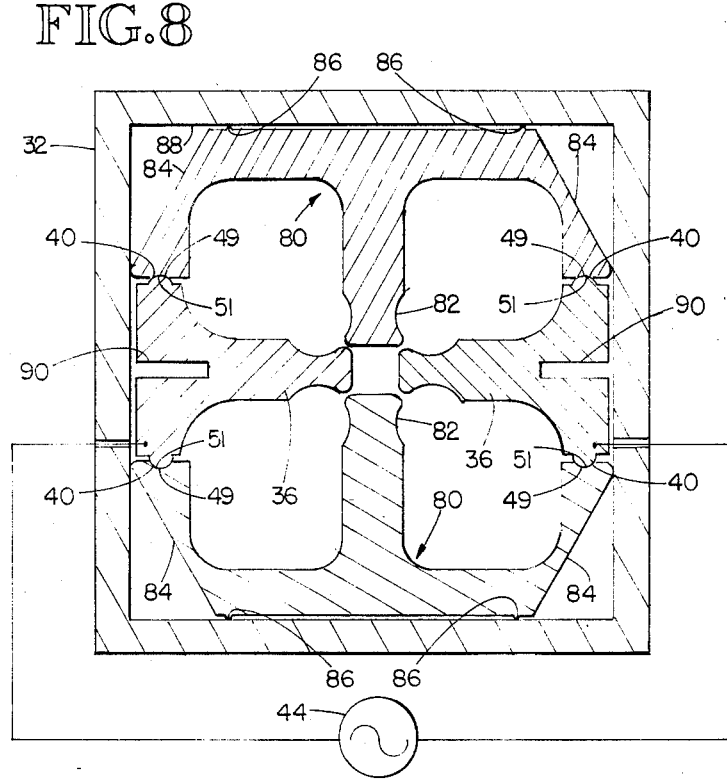
FIG. 8 is a cross-sectional view of a seventh embodiment of the invention.

FIG. 8 is a cross-sectional view of a seventh embodiment of the invention. In this embodiment, the housing 32 encloses two extruded inserts 80 and two extruded electrodes 36. Each insert 80 includes an inwardly directed member 82 and two winged-out members 84. The inserts 80 also include longitudinal ridges 86, to facilitate outgassing of the surfaces of the insert 80 and surfaces 88 of housing 32. The winged-out members each also make contact with the inner surface 88 of the housing 32. The winged-out members 84 further include a V-groove 49 that interacts with the protrusions 51 (or equivalent structures) on the insulated electrodes 36, as discussed in connection with FIG. 4.

The electrodes 36 have longitudinal slots 90 in the base of each electrode, which is disposed toward the inner wall 88. When loaded by opposing forces on the protrusions 51, the base of the electrodes springs together and results in forces that hold the electrodes 36 and the inserts 80 in position within the housing 32. The embodiment of FIG. 8 can be assembled by placing the two inserts 80 within the housing 32 and then locking them in position by forcing the protrusions 51 (or equivalent structures) of the electrodes 36 into the V-grooves 49 of the winged-out members 84 as the electrodes 36 are inserted longitudinally into the housing 32. The electrodes 36 can be connected to the voltage source 44 in the conventional manner.

The conduction/convection-cooled, gas-insulated laser structures of FIGS. 3 and 4 are ideally suited as replacements for metal-ceramic gas lasers of the prior art, such as that disclosed in U.S. Pat. No. 4,393,506. This is because both of these devices use similar low-cost fabrication techniques. However, the all-metal extruded designs shown in FIGS. 3 and 4 are also capable of operating within the military temperature ranges and obviate the need for prior art all-ceramic structures. Each of the novel embodiments of the invention herein disclosed can be provided in other folded configurations for better packaging and higher power levels. Furthermore, the anodized and printed circuit configurations of the embodiments illustrated in FIGS. 1 and 2 would find very advantageous use in small, rugged devices exposed to severe shock and vibration, such as in missiles and munitions where only short operating times are required.

It will now be understood that what has been disclosed herein comprises all-metal, RF-excited gas lasers which are at least as cost competitive as comparable gas lasers. The structures of these gas lasers combine ceramics and metal components. However, the performance of the disclosed invention, particularly in regard to broad operating temperature ranges, is comparable to more expensive and more complex all-ceramic structures. The present invention overcomes the prior art thermal mismatch problems of less expensive lasers of the prior art by providing an all-metal gas laser which affords the easier fabrication of an all-metal structure while providing the performance advantages of a homogeneous prior art structure. Furthermore, the present invention provides a gas laser structure which can be sealed by welding without requiring costly and potentially disadvantageous wet processing. It eliminates traps and leaks to improve gas cleanliness and outgassing, and it is of reduced complexity and is easier to fabricate and assemble as compared to prior art gas lasers. Alternative embodiments have been disclosed. One such embodiment utilizes a novel printed circuit configuration and another utilizes a novel anodized surface configuration. The third embodiment represents a particularly advantageous and radical departure from prior art laser structures because of the use of readily fabricated extruded parts and furthermore because of the unique capability to rely entirely upon gas conduction/convection cooling. The additional embodiments have structures that are particularly appropriate for folded laser applications or especially easily made lasers. A feature common to all of these embodiments is that at least two of the plurality of electrodes surround and form each of the axial laser bores.

Those having skill in the art to which the present invention pertains will now perceive, as a result of the inventor's teaching herein, various modifications and additions. By way of example, alternative materials used as insulators and electrodes will now become apparent, and, in addition, alternative structural configurations utilizing the novel concepts of the present invention will now become apparent. However, all such modifications and additions are deemed to be within the scope of the invention, which is to be limited only by the claims appended hereto.

I claim:

1. An RF-excited gas laser, comprising:
a pair of spaced, parallel metal plates;
a pair of metal spacers separating said plates, said plates and spacers forming an elongated laser bore;
a laser gas medium within said bore; and
a pair of metal discharge electrodes located upon opposing surfaces within said bore and parallel to the longitudinal axis of said bore, said electrodes being excitable by a source of RF-excited voltage, said electrodes being electrically insulated from said opposing surfaces by nonconductive films between said electrodes and said opposing surfaces, respectively.

2. The gas laser recited in claim 1 wherein said nonconductive films comprise an inorganic material such as polyimide.

3. The gas laser recited in claim 1 wherein said nonconductive films comprise an inorganic dielectric material such as mica.

4. The gas laser recited in claim 1 wherein said nonconductive films comprise an oxide of the electrode metal.

5. The gas laser recited in claim 1 wherein said nonconductive films comprise an oxide of the metal of said opposing surfaces.

6. The gas laser recited in claim 1 wherein the metals of said plates and of said spacers have substantially equal thermal expansion coefficients.

7. The gas laser recited in claim 1 wherein the metal of said plates and the metal of said spacers are the same metals.

8. The gas laser recited in claim 1 wherein the metal of said plates, the metal of said spacers, and the metal of said electrodes are the same metals.

9. The gas laser recited in claim 1 wherein said electrodes are excited by oppositely phased excitation voltages relative to ground potential.

10. The gas laser recited in claim 1 wherein said bore has a width and a height within the range of 0.1 to 0.4 inches.

11. The gas laser recited in claim 1 wherein the material used to form said plates, spacers, electrodes and insulators is aluminum.

12. The gas laser recited in claim 1 wherein the electrodes are anodized.

13. The gas laser recited in claim 1 wherein an additional insulator is applied to the electrode surface facing the bore.

14. The gas laser recited in claim 1 wherein said metal spacers are separated from said metal plates by an air gap.

15. The gas laser recited in claim 14 wherein the laser gas within the plasma communicates with external gas by convection transverse to the bore axis.

16. The gas laser recited in claim 14, further comprising a source of RF-excited voltage connected to said pair of metal discharge electrodes, the voltage generating a plasma in said elongated laser bore, substantially all of the heat generated by the plasma being carried away from the laser bore by conduction, convection and radiation through the laser gas medium.

17. An RF-excited gas laser comprising a plasma discharge section formed by a plurality of longitudinal electrodes separated from and contained within a larger envelope containing a laser gas medium, at least two of said electrodes surrounding and forming an axial laser bore, said electrodes being excitable by a source of RF voltage and being electrically insulated from each other in the discharge region by the laser gas medium.

18. The gas laser recited in claim 17, further comprising a source of RF voltage exciting said plurality of electrodes to generate a plasma in said plasma discharge section and means for transferring the heat generated by the discharge in said plasma from said plurality of electrodes to said larger envelope substantially by conduction, convection and radiation through the laser gas medium.

19. The gas laser recited in claim 17 wherein said electrodes have insulated surfaces.

20. The gas laser recited in claim 19 wherein the plurality of longitudinal electrodes comprise two orthogonally oriented pairs of electrodes, a first pair being excitable by a source of RF-excited voltage connected to said pair and the envelope, and a remaining pair of the two orthogonally oriented pairs of electrodes being substantially at electrically ground potential.

21. The gas laser recited in claim 20 wherein the position of the first pair of electrodes is defined by insulators located away from the axial laser bore.

22. The gas laser recited in claim 21 wherein said insulators are located at periodic longitudinal intervals and said insulators are of minimum contact area in order to reduce trapped gases.

23. The gas laser recited in claim 21 wherein the insulators serve as bearings during assembly, said assembly comprising the step of sliding the insulated electrodes into said envelope.

24. The gas laser recited in claim 23 wherein the insulators are made of a high-temperature plastic.

25. The gas laser recited in claim 23 wherein the insulators are made of glass, ceramic or other inorganic substance.

26. The gas laser recited in claim 21 wherein the insulators are an oxide of the extrusion metal.

27. The gas laser recited in claim 17 wherein the plurality of longitudinal electrodes comprise two orthogonally oriented pairs of electrodes, a first pair of said electrodes being driven by oppositely phased excitation voltages and a remaining pair being integral to said envelope.

28. The gas laser recited in claim 27 wherein the plasma discharge section formed by said pairs of electrodes is substantially square in cross section except for corner gaps serving as insulators, said gaps being a small fraction of the electrode width.

29. The gas laser recited in claim 27 wherein the envelope and the remaining pair of electrodes are formed from a unitary aluminum extrusion and the first pair of electrodes are made from oppositely facing pieces of additional aluminum extrusions.

30. The gas laser recited in claim 29 wherein said additional extrusions are provided with surfaces of large cross section to substantially optimize both conduction and convection cooling.

31. The gas laser recited in claim 17 comprising a plurality of electrodes to form a hollow discharge section of substantially closed circumference and having a plurality of RF voltages applied to said electrodes.

32. The gas laser recited in claim 17 wherein the laser gas medium contained within said envelope communicates with the laser gas medium in the plasma discharge section by convection transverse to the laser bore axis.

33. A gas laser as recited in claim 17 wherein the bore has a width and a height in the range between about 0.1 and 0.4 inch.

34. An RF-excited gas laser as recited in claim 17 wherein the heat transfer from the plasma to the envelope is accomplished by heat conduction through an electrically insulating layer of the laser gas disposed away from the discharge region.

35. An RF-excited gas laser as recited in claim 17 consisting of at least two substantially identical such discharge sections optically in series, such discharge sections being coupled with reflector elements having optical power.

36. The laser recited in claim 35 wherein said reflector elements fold said axial laser bore.

37. An RF-excited gas laser comprising a discharge section within a larger envelope containing a laser gas medium, said discharge section forming a laser bore and being defined by a plurality of longitudinal electrodes surrounding said laser bore, each carrying a different RF potential, substantially all surfaces contained within the envelope being directly exposed to the laser gas medium.

38. A gas laser as recited in claim 37 wherein said envelope and said electrodes are aluminum.

39. A gas laser as recited in claim 37 wherein the surfaces of said electrodes are covered with an oxide film.

40. A gas laser as recited in claim 37 wherein the laser gas medium within the discharge region communicates transversely to the laser bore by convection.

41. A gas laser as recited in claim 37 wherein the bore has a width and a height in the range between about 0.1 and 0.4 inch.

42. An RF-excited gas laser comprising a metal envelope, at least one pair of oxidized metal electrodes surrounding and forming a plasma discharge section within an axial laser bore formed by such electrodes, metal oxide insulating material between adjacent electrodes forming the laser bore, and a laser gas medium within said bore.

43. A gas laser as recited in claim 42 comprising an envelope consisting of a first aluminum extrusion having two projections forming two opposed electrodes of a first set of electrodes, a second set of opposed electrodes being formed by two sections of a second extrusion and held in fixed relationship to the envelope to complete a laser bore having a square cross section, said second set of electrodes being insulated from said first pair by metal oxide.

44. A gas laser as recited in claim 43 wherein substantially all heat is transferred from said metal electrodes to said envelope by conduction, convection and radiation through the laser gas medium.

45. A gas laser as recited in claim 43 wherein said additional extrusion has an enlarged surface area to optimize both conduction and convection cooling through the laser gas.

46. A gas laser as recited in claim 45, further comprising a plurality of support insulators located in areas away from the discharge to position the insulated electrodes.

47. A gas laser as recited in claim 42 wherein the bore has a width and a height in the range between about 0.1 and 0.4 inch.

48. An RF-excited gas laser comprising an axial tube containing an internal plasma discharge section wherein all surfaces contained within the tube are directly exposed to a laser gas medium, a plurality of longitudinal metal electrodes excitable by a source of RF voltage, and one or more separate insulators interposed between an electrode and discharge plasma.

49. An RF-excited gas laser, comprising:
  means defining at least one elongated chamber of substantially closed perimeter having a cross-sectional diameter less than about three percent of the chamber length, said chamber including a plurality of metal electrodes for establishing a transverse electric field, said electrodes extending in the length dimension, and insulating means for electrically insulating the electrodes from each other;
  a laser gas medium disposed in said at least one chamber; and
  means for establishing an alternating electric field along a direction transverse to the length of said at least one chamber, the alternating electric field having a frequency ranging from 10 MHz to 1 GHz to establish a laser-exciting plasma.

50. The gas laser of claim 49 wherein said insulating means includes said laser gas medium.

51. The gas laser of claim 50 wherein said at least one elongated chamber is located within a sealed envelope and substantially all surfaces contained within the envelope are directly exposed to the laser gas medium.

52. The gas laser of claim 49 wherein said insulating means is formed by an oxide of the metal forming the electrodes.

53. The gas laser of claim 52 wherein substantially all of the heat generated in the plasma is conducted from the plasma to the envelope by conduction through the laser gas medium.

54. The gas laser of claim 49 wherein said insulating means is formed by coatings applied to said electrodes.

55. The gas laser of claim 49 wherein at least one metal electrode is electrically insulated from said plasma by additional insulating means transverse to the length dimension.

56. The gas laser of claim 49 wherein said elongated chamber is part of a sealed envelope and substantially all surfaces contained within said envelope are directly exposed to the laser gas medium.

57. The gas laser of claim 49, further comprising a plurality of substantially parallel, elongated chambers.

* * * * *

UNITED STATES PATENT AND TRADEMARK OFFICE
CERTIFICATE OF CORRECTION

PATENT NO. : 4,805,182

DATED : February 14, 1989

INVENTOR(S) : Peter Laakmann

It is certified that error appears in the above-identified patent and that said Letters Patent is hereby corrected as shown below:

In claim 20, column 12, line 61, delete "electrically" and substitute therefor --electrical--.

Signed and Sealed this

Twenty-sixth Day of September, 1989

Attest:

DONALD J. QUIGG

Attesting Officer

Commissioner of Patents and Trademarks